(12) United States Patent
Yasuhara

(10) Patent No.: US 8,689,305 B2
(45) Date of Patent: Apr. 1, 2014

(54) INFORMATION PROCESSING APPARATUS, USER AUTHENTICATION METHOD, AND STORAGE MEDIUM

(75) Inventor: Hiroshi Yasuhara, Roslyn Heights, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 13/107,673

(22) Filed: May 13, 2011

(65) Prior Publication Data

US 2011/0289571 A1 Nov. 24, 2011

(30) Foreign Application Priority Data

May 20, 2010 (JP) ................................. 2010-116140

(51) Int. Cl.
*H04L 29/06* (2006.01)

(52) U.S. Cl.
USPC ............... 726/7; 713/182; 713/189; 713/169; 726/18; 726/19

(58) Field of Classification Search
USPC .............................................. 713/169; 726/7
See application file for complete search history.

(56) References Cited

U.S. PATENT DOCUMENTS

| | | | | |
|---|---|---|---|---|
| 6,873,966 B2 * | 3/2005 | Babbitt et al. | ................... | 705/12 |
| 6,934,463 B2 * | 8/2005 | Ishiguro et al. | ............... | 386/259 |
| 8,086,730 B2 * | 12/2011 | Drory et al. | .................... | 709/224 |
| 2005/0097348 A1 * | 5/2005 | Jakubowski et al. | ......... | 713/200 |
| 2005/0113070 A1 * | 5/2005 | Okabe | ............................ | 455/411 |
| 2007/0150735 A1 * | 6/2007 | Futa et al. | ...................... | 713/171 |
| 2009/0094461 A1 | 4/2009 | Tamura | | |

FOREIGN PATENT DOCUMENTS

JP 2009-93342 4/2009

* cited by examiner

*Primary Examiner* — Mohammad L Rahman
(74) *Attorney, Agent, or Firm* — Fitzpatrick, Cella, Harper & Scinto

(57) ABSTRACT

When a first MFP that manages first and second conversion values of user authentication information accesses a second MFP, the first MFP queries about which conversion value is used by the second MFP to execute user authentication processing. The first MFP transmits information based on a conversion value in accordance with the query result to the second MFP. Then, the second MFP executes user authentication processing using information based on a conversion value in accordance with the query result and a conversion value managed by the second MFP.

6 Claims, 7 Drawing Sheets

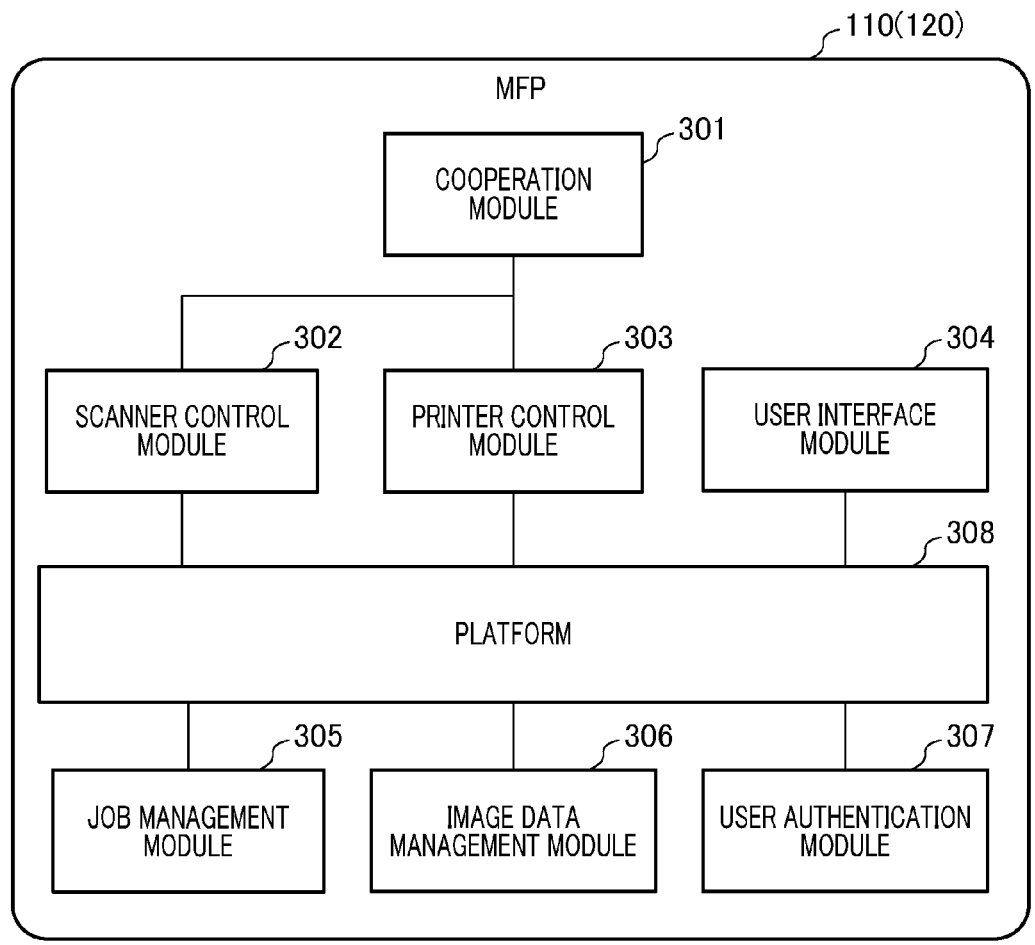

INFORMATION PROCESSING APPARATUS, USER AUTHENTICATION METHOD, AND STORAGE MEDIUM

BACKGROUND OF THE INVENTION

1. Field of the Invention

The present invention relates to an information processing apparatus, a user authentication method, and a storage medium.

2. Description of the Related Art

A technology for improving the security of a system using a hash algorithm has been proposed. A hash algorithm has one-way and collision-resistant characteristics. Thus, a hash algorithm may be utilized when storing a password in a system. More specifically, a hash algorithm is utilized for storing a hash value of a password instead of storing the password as is. In recent years, successful attacks against hash algorithms have revealed the vulnerability of a message digest (MD) 5, which is a kind of hash function. Even if the attack on the hash algorithm is successful, the password cannot always be inferred from a hash value. However, in consideration of the improvement in security, a system needs to employ a hash algorithm that is different from the attacked one.

On the other hand, a system in which an information processing apparatus, which has executed user authentication, accesses another information processing apparatus based on the password input from a user to thereby acquire the execution result and data for the processing performed by the information processing apparatus of the access destination has been proposed. When an information processing apparatus accesses another information processing apparatus as described above, the information processing apparatus may require authentication from another information processing apparatus. Here, in general, a technology that utilizes authenticated ticket information to thereby realize a Single Sign-On service between the information processing apparatuses, such as Kerberos authentication, is widely employed. In order to realize such a Single Sign-On service, a system which employs a server such as a key distribution center (KDC) for centrally managing authentication information about users has been proposed. In the system, an information processing apparatus, service, or the like, which has received a ticket, confirms the validity of the ticket via a server to thereby confirm a user as the authenticated user. Consequently, authentication processing may be omitted.

In addition, a system which can access any information processing apparatus using the same authentication information without a server for centrally maintaining authentication information about users by holding the state of authentication information stored in the respective information processing apparatuses at the same state has been proposed. In the system, when an information processing apparatus accesses another information processing apparatus, authentication processing is executed by reusing authentication information about users, whereby a Single Sign-On service may be provided without requiring the input of authentication information again by a user. Japanese Patent Laid-Open No. 2009-093342 discloses an information processing apparatus that performs user authentication using a hash value managed by a local apparatus and then updates the hash value to a new hash value.

SUMMARY OF THE INVENTION

The information processing apparatus of the present invention is an information processing apparatus that can execute user authentication processing required when an information processing apparatus, which has updated information to be used for user authentication, accesses another information processing apparatus without any reduction in usability.

According to an aspect of the present invention, a first information processing apparatus is provided that includes an execution unit configured to make a user authentication request to a second information processing apparatus after execution of user authentication processing to thereby execute a job operation via the second information processing apparatus in accordance with a user authentication processing result obtained by the second information processing apparatus; a first conversion unit configured to convert user authentication information; a storage unit configured to store first authentication reference information including at least a first conversion value that is a conversion value of user authentication information by the first conversion unit; an input unit configured to input user authentication information; and an authentication unit configured to perform user authentication processing based on the input user authentication information and a conversion value of user authentication information included in the first authentication reference information stored in the storage unit, and when the conversion result of the input user authentication information by the first conversion unit coincides with the first conversion value, determines that user authentication has been successful and adds a second conversion value that is a conversion value of the user authentication information by a second conversion unit to the first authentication reference information; wherein the authentication unit further queries about a conversion value that is included in second authentication reference information managed by the second information processing apparatus and is employed for user authentication processing performed by the second information processing apparatus, with respect to the second information processing apparatus, transmits information that has been generated based on a conversion value in accordance with the query result to the second information processing apparatus, and causes the second information processing apparatus to perform user authentication processing using information that has been generated based on the conversion value in accordance with the query result and the conversion value included in the second authentication reference information.

Further features of the present invention will become apparent from the following description of exemplary embodiments with reference to the attached drawings.

BRIEF DESCRIPTION OF THE DRAWINGS

FIG. 2A is a functional block diagram illustrating an example of an MFP.

FIG. 2B is a diagram illustrating an example of an authentication information table.

DESCRIPTION OF THE EMBODIMENTS

Here, an information processing apparatus to be operated by a user is referred to as a "first information processing apparatus". Also, an information processing apparatus to be accessed by the first information processing apparatus is referred to as a "second information processing apparatus". In order to provide a Single Sign-On service in a system where authentication information is not centrally managed, a password needs to be updated not only in the first information processing apparatus but also in the second information processing apparatus. When a password hash value is not updated in the second information processing apparatus, authentication fails even if authentication from the first information processing apparatus to the second information processing apparatus is implemented by reusing the hash value that has been updated in the first information processing apparatus. In addition, a user needs to input authentication information every time the authentication fails, and thus, much time and labor is required for a user, resulting in a reduction in usability. According to the information processing apparatus of the present invention to be described below, the problems describe above are solved.

Figure 1A:
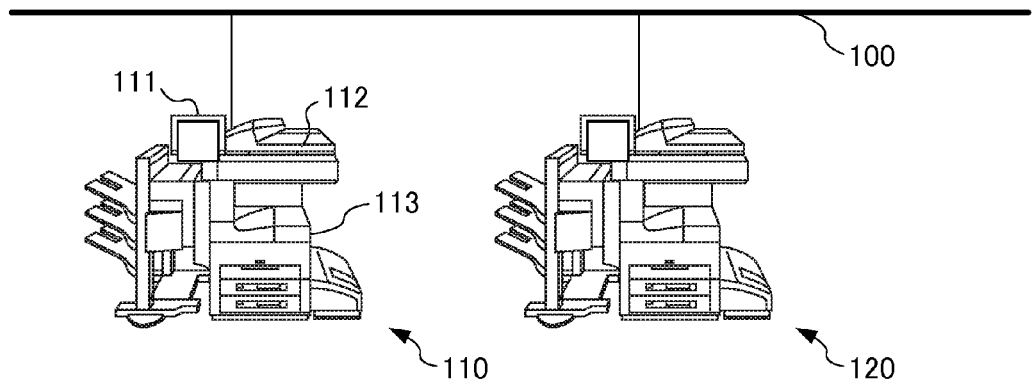
FIG. 1A is a diagram illustrating an example of the system configuration of the present embodiment.

FIG. 1A is a diagram illustrating an example of the system configuration of the present embodiment. The system includes a plurality of MFPs (Multifunction Peripherals) 110 and 120, which are connected to each other via a network 100. Each of the MFPs 110 and 120 is the information processing apparatus of the present embodiment and functions as a first information processing apparatus and a second information processing apparatus, respectively.

The MFP 110 and the MFP 120 have the same configuration. Each of the MFPs 110 and 120 has a copy function. Also, each of the MFPs 110 and 120 includes an image data storage device that reads a document image and stores the image data (referred to also as "document data") obtained by readout in an internal storage. Each of the MFPs 110 and 120 has a data acquisition function that acquires image data from the specified device on the network 100. Furthermore, each of the MFPs 110 and 120 has a print function that prints the acquired image data. The network 100 is, for example, a LAN (Local Area Network). As an operation specific to the present embodiment, the MFP 110 makes a user authentication request to the MFP 120 after execution of user authentication processing, and executes a job operation via the MFP 120 in accordance with a user authentication processing result obtained by the MFP 120. Note that the application range of the present invention is not limited to MFPs.

Figure 1B:
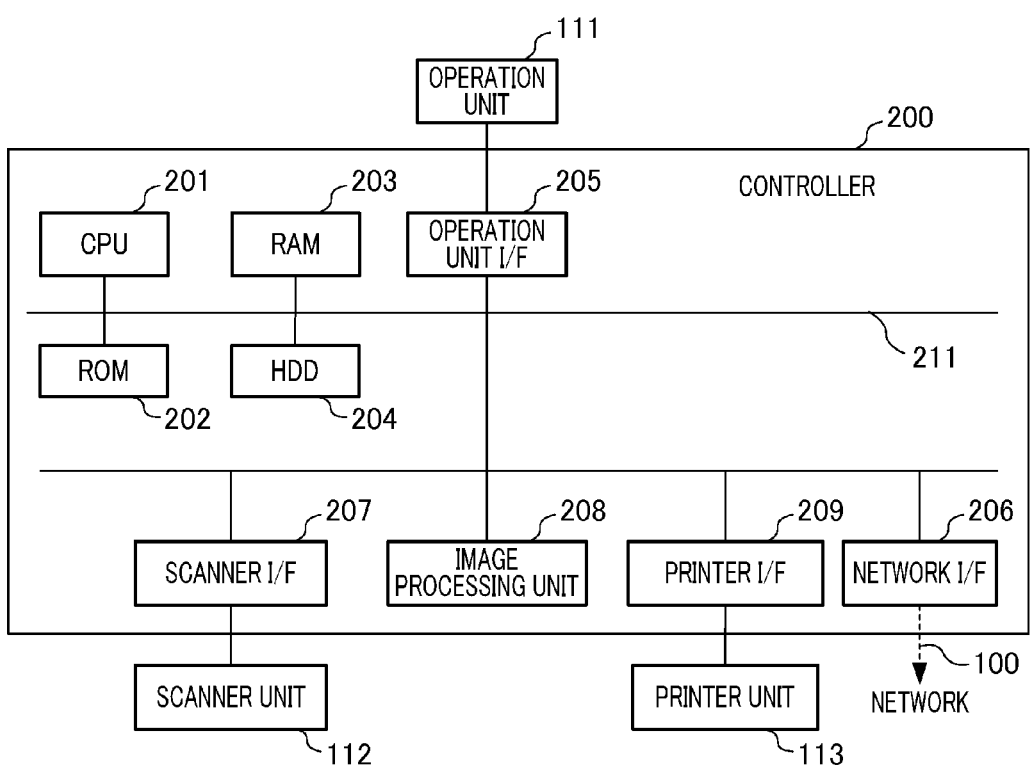
FIG. 1B is a diagram illustrating an example of the hardware configuration of the present embodiment.

FIG. 1B is a diagram illustrating an example of the hardware configuration of the MFP shown in FIG. 1A. FIG. 1B is a diagram illustrating an example of the hardware configuration of the MFP 110. The hardware configuration of the MFP 120 is the same as that of the MFP 110. The MFP 110 includes an operation unit 111, a scanner unit 112, a printer unit 113, and a controller 200. The operation unit 111 inputs information in accordance with the operation by a user of the MFP 110. More specifically, the operation unit 111 functions as an input unit configured to input user authentication information. In the present embodiment, user authentication information is information that includes the password of a user, and, for example, includes the account name and the password of a user. Also, the operation unit 111 performs information display processing in accordance with the instructions given by the controller 200. The scanner unit 112 functions as an image input device.

The scanner unit 112 reads an image on a document and generates image data. Note that a document is set on a document feeder, and a document read instruction is provided from the controller 200 to the scanner unit 112. When the scanner unit 112 receives the instruction, the scanner unit 112 successively feeds documents from the document feeder one by one to thereby perform a document reading operation. A document reading method is not limited to an automatic feeding operation performed by the document feeder. Another document reading method may include placing a document on a document positioning glass plate (not shown) and moving an exposure unit to perform a document scanning operation. The printer unit 113 functions as an image output device. The printer unit 113 receives image data from the controller 200, and forms an image on a document based on the received image data. An image processing method according to the present embodiment is an electro-photographic method using a photosensitive drum or a photosensitive belt. The present invention is not limited to the above-described method, but an inkjet method or the like may also be employable.

The controller 200 controls the MFP overall. The controller 200 is electrically connected to the operation unit 111, the scanner unit 112, and the printer unit 113. The controller 200 is further connected to the network 100 via a network (Network) I/F (Interface) 206. In other words, the controller 200 is connected to another information processing apparatus via the network 100. With this arrangement, the MFP 110 can communicate with the MFP 120 via a network.

The controller 200 includes a CPU 201, a ROM 202, a RAM 203, an HDD 204, an operation unit I/F 205, and a network I/F 206, where CPU is an abbreviation for Central Processing Unit, ROM is an abbreviation for Read Only Memory, RAM is an abbreviation for Random Access Memory, and HDD is an abbreviation for Hard Disk Drive. The controller 200 further includes a scanner I/F 207, an image processing unit 208, and a printer I/F 209.

The CPU 201 controls the controller 200 overall. More specifically, the CPU 201 executes a control program stored in the HDD 204 to thereby integrally control various processes to be performed in the controller 200. The control program is a computer program that realizes a method for controlling the information processing apparatus of the present embodiment. Also, the CPU 201 integrally controls access to various devices that are currently connected and access from other devices.

The ROM 202 stores a program for booting the MFP. The RAM 203 functions as a system work memory used by the CPU 201 for its operation. The RAM 203 also functions as a memory that temporarily stores image data. The RAM 203 has an area that holds contents stored employing a back-up power source or the like even after the power source of the apparatus body is turned off and another area that cannot retain the stored contents after the turn-off of the power source.

The HDD 204 stores a control program that realizes a method for controlling the information processing apparatus of the present embodiment. Also, the HDD 204 can store system software, image data, authentication information for user authentication, and information about a secret key and a public key for implementing encryption. The operation unit I/F 205 is an interface unit that connects a system bus 211 to the operation unit 111. The operation unit I/F 205 receives image data to be displayed on the operation unit 111 via the system bus 211 and outputs the received image data to the operation unit 111. Further, the operation unit I/F 205 outputs information that has been input from the operation unit 111 to the system bus 211. The network I/F 206 is connected to the network 100 and the system bus 211 to input/output information. The scanner I/F 207 performs various processes (correction, modification, and editing) on image data received from the scanner unit 112. The scanner I/F 207 has a function for determining whether the received image data is a color document or a monochrome document. Further, the scanner I/F 207 has a function for determining whether the received image data is a text document or a photo document. The image processing unit 208 executes various kinds of image processes such as image data direction conversion, image compression/decompression, and the like. Also the image processing unit 208 has a function that synthesizes image data stored in the HDD 204 to generate one set of image data. The printer I/F 209 receives image data transmitted from the image processing unit 208 and executes image forming processing for the image data while referring to the attribute data added to the image data. The image data that has undergone the image forming processing is output to the printer unit 113. In the example shown in FIG. 1B, an MFP is intended to be a network MFP that executes display of a UI (User Interface). The MFP may be a general purpose computer or the like to which a general purpose scanner, a general purpose printer, and the like are connected.

FIG. 2A is a functional block diagram illustrating an example of the MFPs 110 and 120. The function of a software module provided in the MFP shown in FIG. 2A is realized by the fact that the CPU 201 executes a control program that is stored in the HDD 204 of the MFP.

The MFP shown in FIG. 2A includes a cooperation module 301, a scanner control module 302, a printer control module 303, a user interface module 304, and a job management module 305. The MFP further includes an image data management module 306, a user authentication module 307, and a platform 308. The cooperation module 301 is a software module that controls the cooperation with another node. More specifically, the cooperation module 301 communicates with another MFP via the network I/F 206. The scanner control module 302 controls the scanner unit 112 via the scanner I/F 207. The printer control module 303 controls the printer unit 113 via the printer I/F 209. The user interface module 304 controls the operation unit 111 via the operation unit I/F 205, and executes the reception of input from a user and the display of information to a user. The job management module 305 receives instructions such as a job execution instruction, a job stop instruction, or the like from the user interface module 304. The job management module executes a scan job, a print job, or the storage and acquisition of image data via the scanner control module 302, the printer control module 303, the cooperation module 301, and the image data management module 306. The image data management module 306 performs processing for storing and acquiring image data via the HDD 204. The user authentication module 307 functions as an authentication unit, and performs user authentication processing or generates authentication information to be transmitted to another MFP. For this purpose, the user authentication module 307 manages an authentication information table to be described below. The platform 308 performs processing for providing the cooperation with a software module provided in the MFP.

FIG. 2B is a diagram illustrating an example of an authentication information table. The authentication information table is a table that manages authentication information. The authentication information table is stored in the HDD 204, and is capable of reading, writing, searching, and updating of data. Authentication information to be stored in the authentication information table has a data configuration including an account name and a hash value associated with the account name. A hash value_1 shown in FIG. 2B is a hash value obtained after execution of a first hash algorithm on a user's password. A hash value_2 is a hash value obtained after execution of a second hash algorithm on a user's password. In other words, the HDD 204 is a storage unit configured to store first authentication reference information (authentication information shown in FIG. 2B) including at least a first conversion value (hash value_1) that is a conversion value of user authentication information (password) by a first conversion unit (first hash algorithm).

The user authentication module 307 searches for a hash value that corresponds to an account name input from a user. The user authentication module 307 converts a password input from a user using a hash algorithm that corresponds to the searched hash value. Then, when the searched hash value coincides with the conversion value obtained by the conversion of the password, the user authentication module 307 determines that user authentication has been successful.

Figure 3:
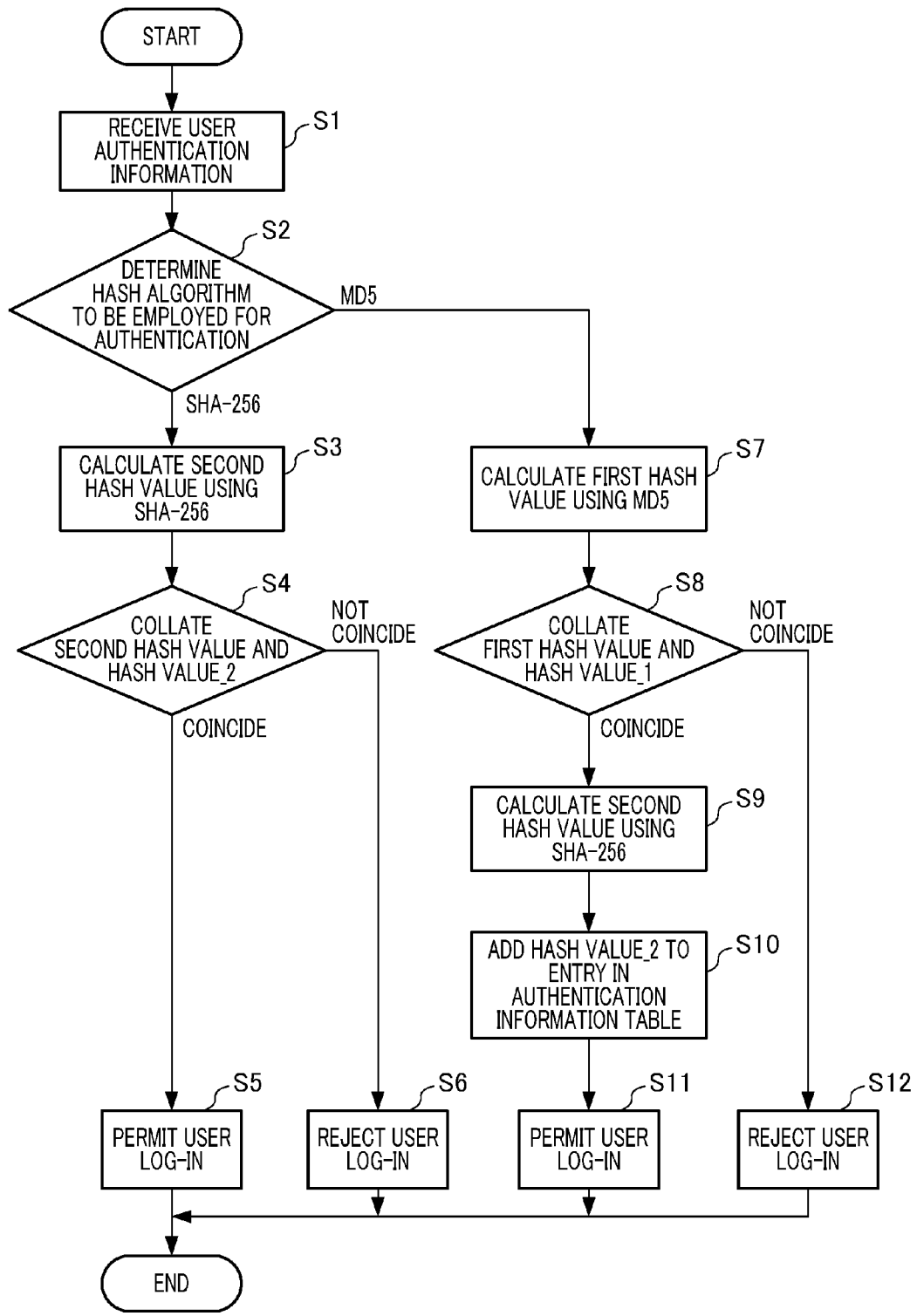
FIG. 3 is a diagram illustrating an example of a user authentication processing flow performed by an MFP.

FIG. 3 is a diagram illustrating an example of a user authentication processing flow performed by an MFP. In this example, a first hash algorithm and a second hash algorithm are hash functions of which the security levels are different from each other. More specifically, the first hash algorithm is MF5, and the second hash algorithm is SHA (e.g., SHA-256). It is assumed that authentication information including the hash value_1, which is a conversion value of a password by MD5, is stored in advance in the authentication information table. Of course, another hash algorithm may also be employed for the present invention. Furthermore, it is assumed that, in the state prior to execution of user authentication, an MFP does not accept a job operation including a job input via the operation unit 111.

First, in accordance with a user's operation input, the operation unit 111 inputs user authentication information including the account name and the password of a user, and the user authentication module 307 receives the user authentication information (step S1). Next, the user authentication module 307 determines a hash algorithm to be employed for user authentication processing from an authentication information table (step S2). More specifically, the user authentication module 307 determines whether or not the account name received in step S1 is present in the authentication information table. When the account name is present in the authentication information table, the user authentication module 307 determines whether or not the hash value_2 is set as a hash value corresponding to the account name in the authentication information table. When the hash value_2 is set in the authentication information table, the user authentication module 307 determines that SHA-256 is to be employed for user authentication processing, and the process advances to step S3. On the other hand, when the hash value_2 is not set in the authentication information table, the user authentication module 307 determines that MD5 is to be employed for user authentication processing, and the process advances to step S7.

In step S3, the user authentication module 307 converts the password received in step S1 using SHA-256 to thereby calculate a hash value (second hash value) (step S3). Subsequently, the user authentication module 307 collates the calculated second hash value and the hash value_2 set in the authentication information table (step S4). When the second hash value coincides with the hash value_2, the user authentication module 307 permits a user log-in operation (step S5). With this arrangement, the MFP transits to the state where a job operation performed by a user is acceptable. When the second hash value does not coincide with the hash value_2, the user authentication module 307 rejects a user log-in operation (step S6). The user authentication module 307 displays an error message on the operation unit 111 via the user interface module 304, notifies a user about the rejection of the log-in operation, and maintains the state where a job operation is not accepted.

In step S7, the user authentication module 307 converts the password received in step S1 using MD5 to thereby calculate a hash value (first hash value) (step S7). Subsequently, the user authentication module 307 collates the calculated first hash value and the hash value_1 set in the authentication information table (step S8). The hash value_1 to be processed in step S8 is the hash value_1 that corresponds to the account name, which has been input in step S1, among the hash values set in the authentication information table.

When the first hash value does not coincide with the hash value_1, the user authentication module 307 rejects a user log-in operation (step S12). The user authentication module 307 displays an error message on the operation unit 111 via the user interface module 304, notifies a user about the rejection of the log-in operation, and maintains the state where a job operation is not accepted. When the first hash value coincides with the hash value_1, the process advances to step S9.

In step S9, the user authentication module 307 converts the password received in step S1 using SHA-256 to thereby calculate the hash value_2 (step S9). Then, the user authentication module 307 adds the calculated hash value_2 to an entry (one line worth of data), which corresponds to the current account name, in the authentication information table (step S10), and the process advances to step S11. In step S11, the user authentication module 307 permits a user log-in operation (step S11). With this arrangement, the MFP transits to the state where a job operation performed by a user is acceptable. As described with reference to FIG. 3, the user authentication module 307 functions as a unit that performs user authentication processing based on the user authentication information input by the operation unit 111 and a hash value included in the authentication information stored in the HDD 204. When the conversion result of the input user authentication information by the first conversion unit (MD5) coincides with the first conversion value (hash value_1), the user authentication module 307 determines that user authentication has been successful. Then, the user authentication module 307 adds the second conversion value (hash value_2), which is the conversion value of the user authentication information by the second conversion unit (SHA-256) to the authentication information table.

Figure 4:
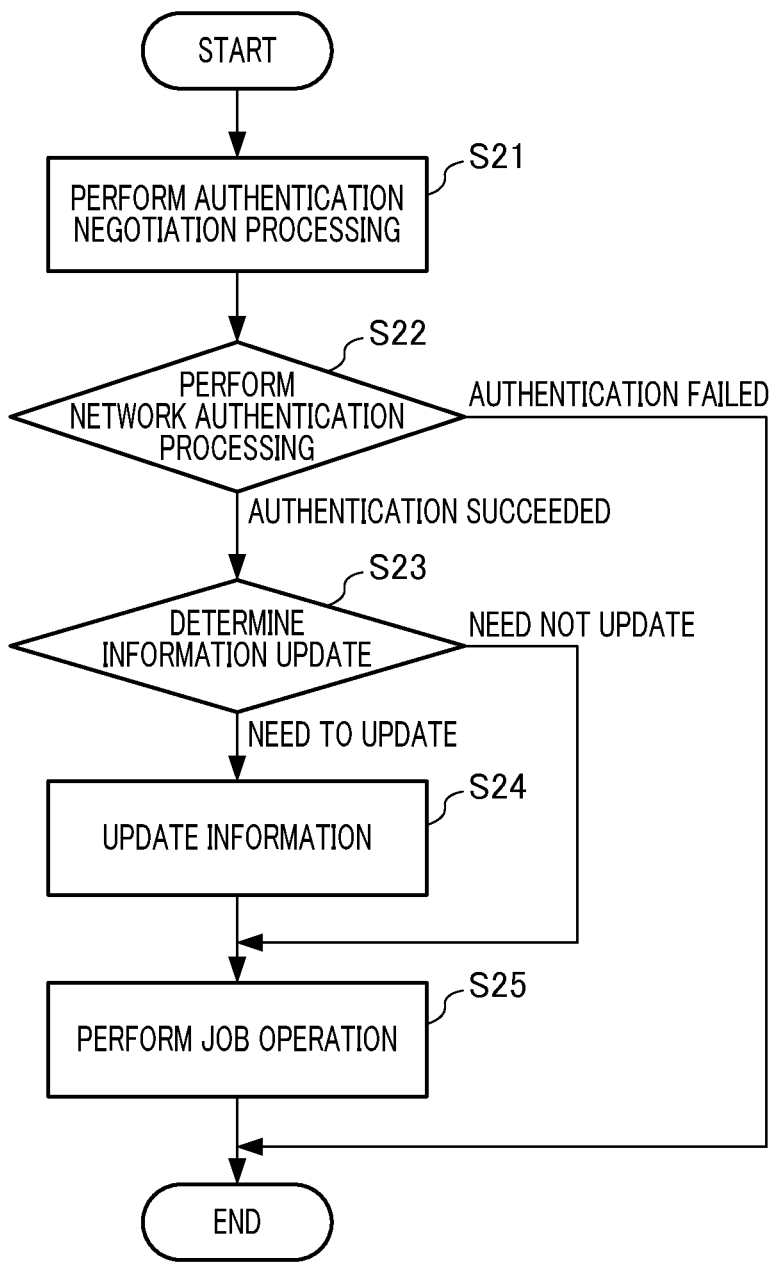
FIG. 4 is a diagram illustrating an example of an operation processing flow when an MFP performs a job operation via another MFP.

FIG. 4 is a diagram illustrating an example of an operation processing flow when an MFP performs a job operation via another MFP. In this example, a description will be given of operation processing executed in the system overall when the MFP 110 executes user authentication processing described with reference to FIG. 3 so as to permit a user log-in operation, and then the MFP 110 performs a job operation via the MFP 120.

Firstly, the MFP 110 performs authentication negotiation processing (step S21). Authentication negotiation processing is processing in which the MFP 110 queries a hash value to be used for user authentication processing by the MFP 110 with respect to the MFP 120. More specifically, the MFP 110 queries whether the MFP 120 performs user authentication processing using either the hash value_1 or the hash value_2, and obtains a hash value corresponding to the query result. Next, the MFP 120 performs network authentication processing using the hash value obtained by authentication negotiation processing in step S21 (step S22). Network authentication processing is authentication processing for authenticating a user who has logged into the MFP 110, which is executed by the MFP 120 in accordance with a request from the MFP 110 via the network 100. When user authentication has failed as a result of network authentication processing in step S22, the process is ended.

When user authentication has been successful as a result of network authentication processing in step S22, the MFP 110 determines whether or not the authentication information table managed by the MFP 120 needs to be updated (step S23). When the hash value_1 has been obtained by authentication negotiation processing in step S21, and in consequence, user authentication processing using the hash value_1 has been performed in step S22, the MFP 110 determines that the authentication information table managed by the MFP 120 needs to be updated. When the hash value_2 has been obtained by authentication negotiation processing in step S21, and in consequence, user authentication processing using the hash value_2 has been performed in step S22, the MFP 110 determines that the authentication information table managed by the MFP 120 does not need to be updated.

When the MFP 110 determines that the authentication information table managed by the MFP 120 does not need to be updated, the process advances to step S25. On the other hand, when the MFP 110 determines that the authentication information table managed by the MFP 120 needs to be updated, the MFP 110 performs information update processing (step S24). In step S24, the MFP 110 provides instructions to the MFP 120 about updating the authentication information table managed by the MFP 120, and the MFP 120 updates the authentication information table in accordance with the instructions given by the MFP 110.

Next, the MFP 110 performs a job operation via the MFP 120 (step S25). For example, the MFP 110 acquires image data stored in the MFP 120 from the MFP 120, and prints the acquired image data. More specifically, the operation unit 111 of the MFP 110 inputs a print job execution instruction in accordance with a user's operation input, and the job management module 305 receives the print job execution instruction. The job management module 305 acquires image data from the MFP 120 by making the job management module 305 cooperate with the user authentication module 307, the printer control module 303, and the cooperation module 301 to thereby implement a print job. Also, in the MFP 120, the job management module 305 controls the image data management module 306 and the cooperation module 301 so as to transmit image data to the MFP 110.

Figure 5:
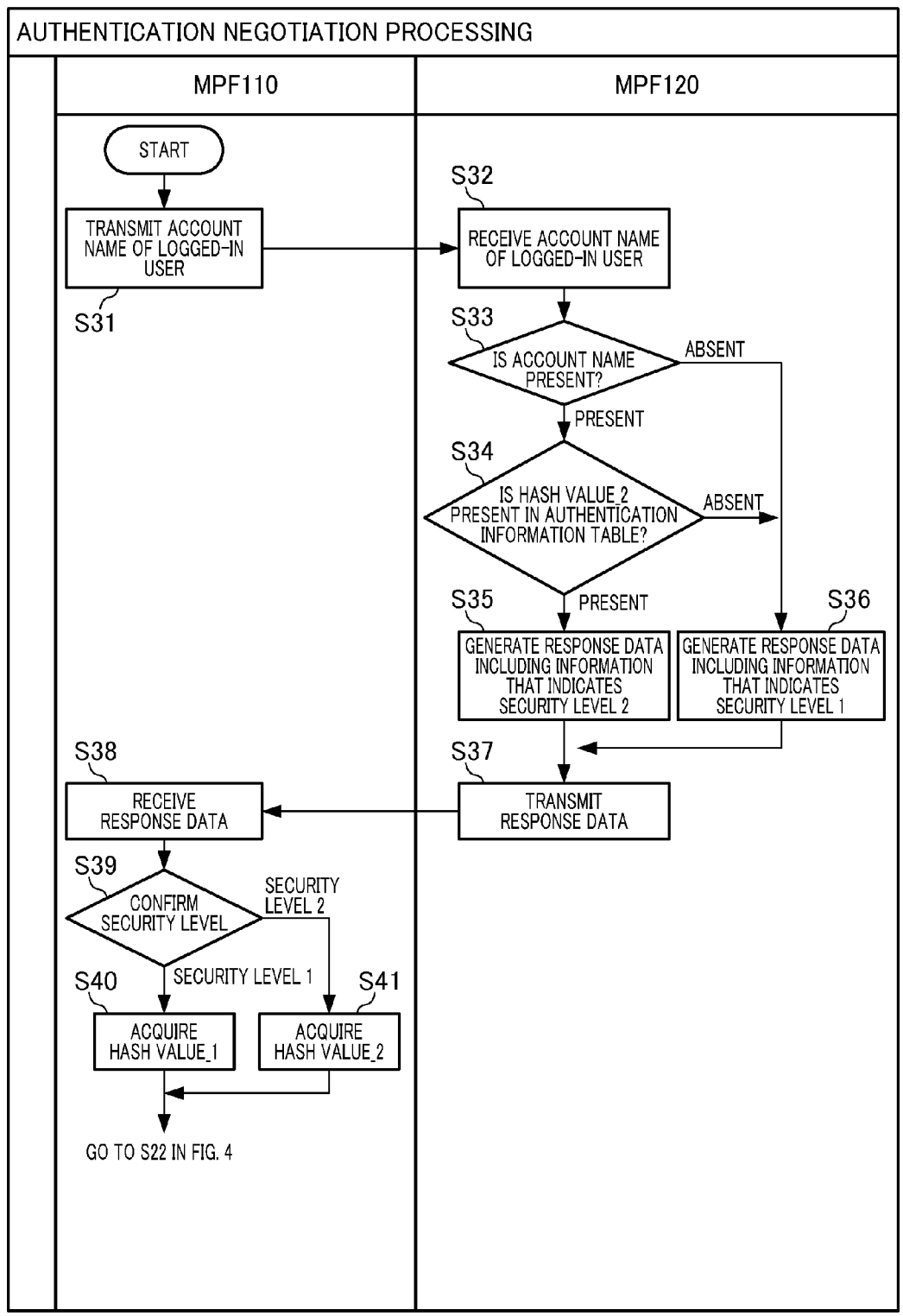
FIG. 5 is a flowchart illustrating authentication negotiation processing.

FIG. 5 is a flowchart illustrating authentication negotiation processing in step S21 shown in FIG. 4. Firstly, the user authentication module 307 of the MFP 110 transmits the account name of a user who is logged into the MFP 110 to the MFP 120 via the cooperation module 301 and the network 100 (step S31). The user authentication module 307 of the MFP 120 receives the account name that has been transmitted by the MFP 110 in step S1 (step S32). Subsequently, the user authentication module 307 of the MFP 120 determines whether or not the account name received in step S32 is present in the authentication information table (step S33). When the account name received in step S32 is absent in the authentication information table, the user authentication module 307 generates response data including information that indicates security level 1 (step S36). In this example, security level 1 is assumed to be the security level set within a hash algorithm corresponding to the hash value_1. In other words, information that is included in response data and indicates the security level 1 indicates the fact that the MFP 120 performs user authentication processing using the hash value_1.

When the account name received in step S32 is present in the authentication information table, the user authentication module 307 determines whether or not the hash value_2 is present in an entry that corresponds to the account name in the authentication information table (step S34). When the hash value_2 is absent in an entry that corresponds to the account name in the authentication information table, the process advances to step S36. On the other hand, when the hash value_2 is present in an entry that corresponds to the account name in the authentication information table, the process advances to step S35.

In step S35, the user authentication module 307 generates response data including information that indicates security level 2 (step S35). In this example, the security level 2 is assumed to be the security level set within a hash algorithm corresponding to the hash value_2. In other words, information that is included in response data and indicates the security level 2 indicates the fact that the MFP 120 performs user authentication processing using the hash value_2. Subsequently, the user authentication module 307 transmits response data to the MFP 110 via the cooperation module 301 and the network 100 (step S37).

Next, the user authentication module 307 of the MFP 110 receives response data from the user authentication module 307 of the MFP 120 (step S38). Then, the user authentication module 307 of the MFP 110 determines whether or not information indicating the security level 1 is included in the received response data (step S39). When information indicating the security level 1 is included in the response data, the process advances to step S40. On the other hand, when information indicating the security level 1 is not included in the response data, that is, information indicating the security level 2 is included in the response data, the process advances to step S41.

In step S40, the user authentication module 307 of the MFP 110 acquires the hash value_1 from an entry that corresponds to the account name in the authentication information table (step S40), and the process advances to step S22 shown in FIG. 4. In step S41, the user authentication module 307 of the MFP 110 acquires the hash value_2 from an entry that corresponds to the account name in the authentication information table (step S41), and the process advances to step S22 shown in FIG. 4. As described with reference to FIG. 5, the user authentication module 307 of the MFP 110 executes the following processing. The user authentication module 307 queries about a conversion value, which is included in second authentication reference information (authentication information in the authentication information table) managed by the MFP 120 and is employed for user authentication processing performed by the MFP 120, with respect to the MFP 120. Then, the user authentication module 307 transmits information (response data), which has been generated based on the conversion value in response to the query result, to the MFP 120. With this arrangement, the user authentication module 307 causes the MFP 120 to perform user authentication processing using response data and the conversion value included in second authentication reference information. Even if the MFP 120 does not have the hash value_2, the MFP 110 can execute user authentication processing using the hash value_1. Consequently, the user who has logged into the MFP 110 can receive user authentication without inputting again the password input upon initial log-in.

Figure 6:
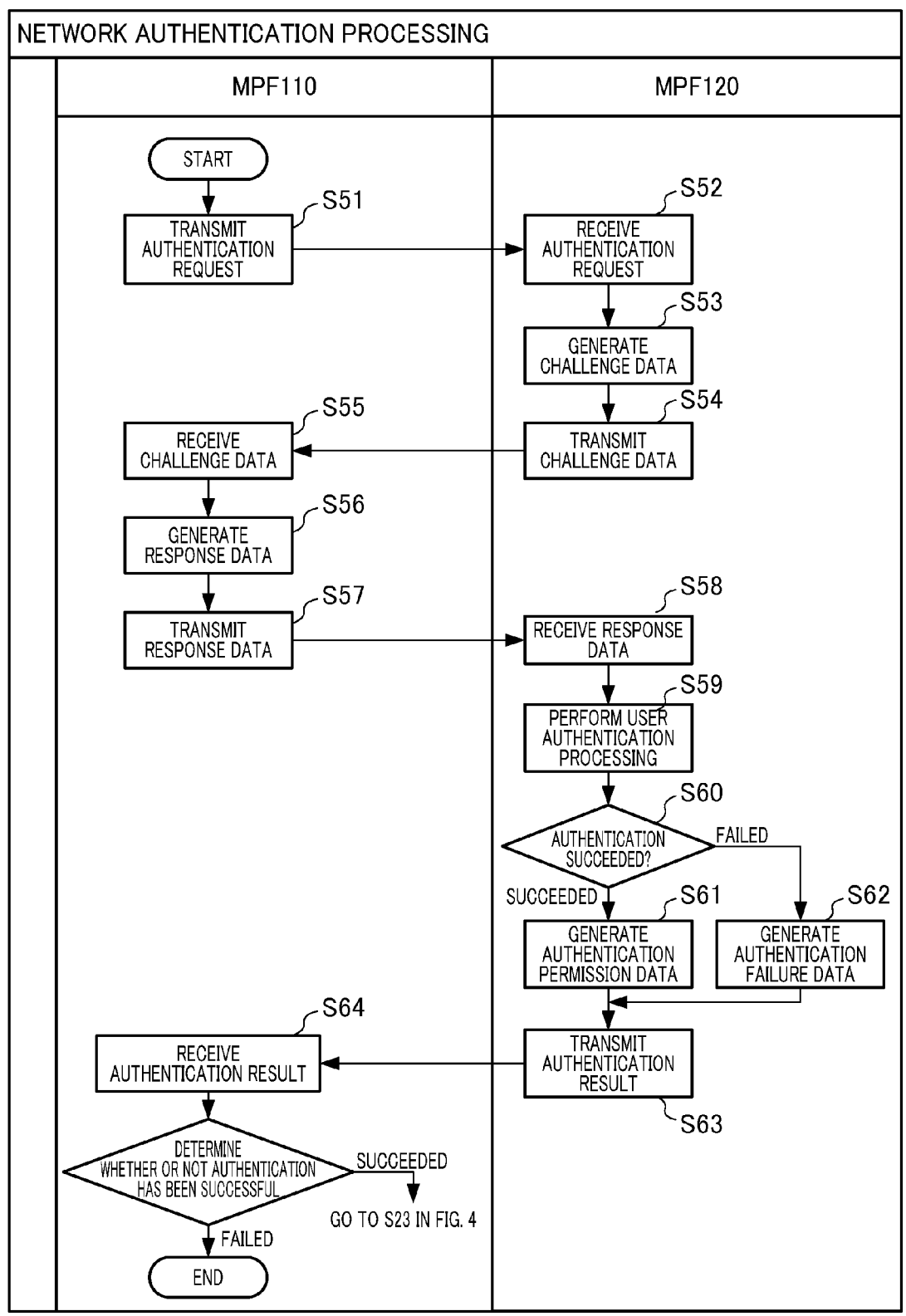
FIG. 6 is a flowchart illustrating network authentication processing.

FIG. 6 is a flowchart illustrating network authentication processing in step S22 shown in FIG. 4. Firstly, the user authentication module 307 of the MFP 110 transmits an authentication request to the MFP 120 via the cooperation module 301 and the network 100 (step S51). The authentication request is a request which is made to the MFP 120 about user authentication relating to a user who is currently logged into the MFP 110.

Next, the user authentication module 307 of the MFP 120 receives the authentication request that has been transmitted from the MFP 110 in step S51 (step S52). Subsequently, the user authentication module 307 of the MFP 120 generates random numbers as challenge data (step S53). The user authentication module 307 transmits the generated challenge data to the MFP 110 via the cooperation module 301 and the network 100 (step S54).

Next, the user authentication module 307 of the MFP 110 receives challenge data, which has been transmitted from the MFP 120 in step S54, via the network 100 and the cooperation module 301 (step S55). Subsequently, the user authentication module 307 generates response data (step S56). More specifically, the user authentication module 307 generates response data based on the hash value acquired in step S40 or step S41 shown in FIG. 5 and the challenge data received in step S55. When the response data is generated based on the hash value_1, the user authentication module 307 adds information indicating the security level 1 to the response data. On the other hand, when the response data is generated based on the hash value_2, the user authentication module 307 adds information indicating the security level 2 to the response data. The user authentication module 307 transmits the response data to the MFP 120 via the cooperation module 301 and the network 100 (step S57).

Next, the user authentication module 307 of the MFP 120 receives the response data, which has been transmitted from the MFP 110 in step S57, via the network 100 and the cooperation module 301 (step S58). Subsequently, the user authentication module 307 executes user authentication processing (step S59). In step S59, the user authentication module 307 executes user authentication processing as follows. The user authentication module 307 acquires an entry corresponding to the account name of a current user from the authentication information table. Also, the user authentication module 307 confirms whether or not information indicating either the security level 1 or 2 has been added to the response data received in step S58. The user authentication module 307 acquires a hash value that is written in the acquired entry and corresponds to the confirmed information. Based on the acquired hash value and the challenge data generated in step S53, the user authentication module 307 generates verification data. The user authentication module 307 generates verification data using the same method as that for generating response data that is generated in step S56. Then, the user authentication module 307 determines whether or not the generated verification data coincides with the response data received in step S58.

Subsequently, the user authentication module 307 determines whether or not the user authentication has been successful (step S60). When verification data coincides with response data, the user authentication module 307 determines that user authentication has been successful, and the process advances to step S61. On the other hand, when verification data does not coincide with response data, the user authentication module 307 determines that user authentication has been failed, and the process advances to step S62. In step S61, the user authentication module 307 generates authentication permission information (step S61). Authentication permission information is information indicating that the user authentication has been successful. The user authentication module 307 includes authentication permission information for the user authentication result. Also, in step S62, the user authentication module 307 generates authentication failure information (step S62). Authentication failure information is information indicating that the user authentication has been failed. The user authentication module 307 includes authentication failure information in the user authentication processing result. Subsequently, the user authentication module 307 transmits the user authentication processing result to the MFP 110 via the cooperation module 301 and the network 100 (step S63).

Next, the user authentication module 307 of the MFP 110 receives the user authentication processing result that has been transmitted from the MFP 120 in step S63 (step S64). The user authentication module 307 determines whether or not the user authentication has been successful based on the received user authentication processing result (step S65). More specifically, when authentication failure information is included in the user authentication processing result, the user authentication module 307 determines that the user authentication has failed, and the process is ended. Also, when authentication success information is included in the user authentication processing result, the user authentication module 307 determines that the user authentication has been successful, and the process advances to step S23 shown in FIG. 4.

Figure 7:
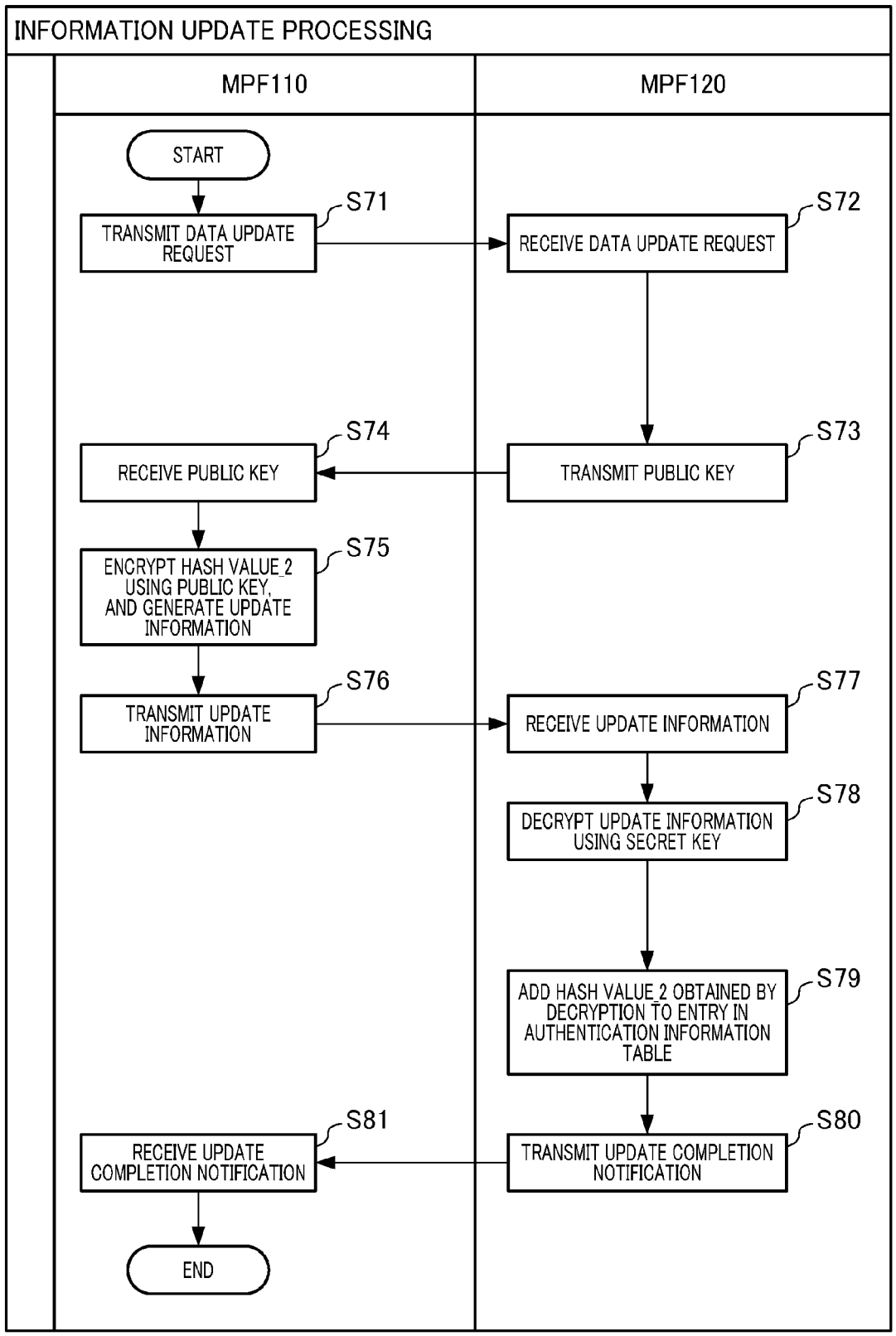
FIG. 7 is a flowchart illustrating information update processing.

FIG. 7 is a flowchart illustrating information update processing in step S24 shown in FIG. 4. Firstly, the user authentication module 307 of the MFP 110 transmits a data update request to the MFP 120 via the cooperation module 301 and the network 100 (step S71). The data update request is a request that is made to the MFP 120 about an update of an entry in the authentication information table managed by the user authentication module 307 of the MFP 120.

Next, the user authentication module 307 of the MFP 120 receives the data update request that has been transmitted from the MFP 110 in step S71 (step S72). Subsequently, the user authentication module 307 of the MFP 120 acquires a public key that is stored in advance in the HDD 204 and corresponds to the MFP 110, and transmits the acquired public key to the MFP 110 (step S73). Next, the user authentication module 307 of the MFP 120 receives the public key that has been transmitted from the MFP 120 in step S73 (step S74). Then, the user authentication module 307 encrypts the hash value_2 using the public key, and generates update information (step S75). More specifically, the user authentication module 307 acquires the hash value_2 from an entry that corresponds to the account name of a current user in the authentication information table. Then, the user authentication module 307 encrypts the acquired hash value_2 using the public key that has been received in step S74, and generates update information. Subsequently, the user authentication module 307 transmits the generated update information to the MFP 120 (step S76), and provides instructions to the MFP 120 about an update of an entry in the authentication information table using the hash value_2 that has been obtained by the decryption of update information.

Next, the user authentication module 307 of the MFP 120 receives the update information that has been transmitted from the MFP 110 in step S76 (step S77). Subsequently, the user authentication module 307 decrypts the update information using the secret key that is stored in advance in the HDD 204 (step S78). The hash value_2 is obtained by decryption. Note that the secret key is a secret key which is paired with the public key transmitted in step S73. Next, the user authentication module 307 adds the hash value_2, which has been obtained by decryption processing in step S78, to an entry that corresponds to the current account name in the authentication information table (step S79). Next, the user authentication module 307 transmits an update completion notification to the MFP 110 (step S80). The update completion notification is a notification indicating that the update of the authentication information table has been completed. The user authentication module 307 of the MFP 110 receives the update completion notification that has been transmitted from the MFP 120 in step S80 (step S81), and the process is ended.

As described with reference to FIGS. 4, 6, and 7, the user authentication module 307 of the MFP 110 performs the following processing. When the query result of making a query about a conversion value to be used for user authentication processing to the MFP 120 indicates the first conversion value (hash value_1), the user authentication module 307 transmits the information (response data) that has been generated based on the first conversion value to the MFP 120. Then, when the user authentication processing performed by the MFP 120 has been successful, the user authentication module 307 provides instructions to the MFP 120 about adding the second conversion value (hash value_2) to the authentication information table managed by the MFP 120. Therefore, the MFP 110 can automatically update the authentication information managed by the MFP 120 in response to the user authentication processing result by the MFP 120.

According to the present invention described above, a second information processing apparatus, which has received a user authentication processing request from a first information processing apparatus having a first and a second conversion values of user authentication information, can execute user authentication processing using the first conversion value without the second conversion value. Consequently, the user who has logged into the first information processing apparatus can receive user authentication in the second information processing apparatus without inputting again the user authentication information that has been input upon initial log-in.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-116140 filed May 20, 2010, which is hereby incorporated by reference herein in its entirety.

What is claimed is:

1. A first information processing apparatus comprising:
a processor and a memory storing computer code that, when executed by the processor, performs the following steps:
making a user authentication request to a second information processing apparatus after execution of user authentication processing to thereby execute a job operation via the second information processing apparatus in accordance with a user authentication processing result obtained by the second information processing apparatus;

converting, by a first conversion unit, user authentication information to a conversion value;

storing, in a storage unit, first authentication reference information including at least a first conversion value that is a conversion value of user authentication information converted by the first conversion unit;

inputting, by an input unit, user authentication information; and performing, by an authentication unit, user authentication processing based on the input user authentication information and a conversion value of user authentication information included in the first authentication reference information stored in the storage unit, and when the conversion result of the input user authentication information by the first conversion unit coincides with the first conversion value, determining that user authentication has been successful and adding a second conversion value that is a conversion value of the user authentication information by a second conversion unit to the first authentication reference information, wherein the authentication unit queries the second information processing apparatus whether the second information processing apparatus performs user authentication processing using either the first conversion value or the second conversion value, wherein, when the authentication unit obtains a query result from the second information processing apparatus which indicates that the second information processing apparatus performs user authentication processing using the first conversion value, the authentication unit performs user authentication processing using the first conversion value, encrypts the second conversion value using an encryption key corresponding to the second information processing apparatus, and sends the encrypted second conversion value to the second information processing apparatus to make the second information processing apparatus store the second conversion value to control so that subsequent user authentication processing is performed using the stored second conversion value, and wherein, when the authentication unit obtains a query result from the second information processing apparatus which indicates that the second information processing apparatus performs user authentication processing using the second conversion value, the authentication unit controls so that the user authentication processing is performed using the second conversion value without using the first conversion value.

2. The first information processing apparatus according to claim 1, wherein the authentication unit transmits information that has been generated based on the first conversion value to the second information processing apparatus when the query result indicates that the second information processing apparatus performs user authentication processing using the first conversion value, and provides instructions to the second information processing apparatus to add the second conversion value to second authentication reference information managed by the second information processing apparatus when the user authentication processing performed by the second information processing apparatus has been successful.

3. The first information processing apparatus according to claim 1, wherein the first conversion unit and the second conversion unit are hash functions of which security levels are different from each other.

4. The first information processing apparatus according to claim 1, wherein the first conversion unit is MD5 and the second conversion unit is SHA.

5. A user authentication method performed by a first information processing apparatus, comprising:

making a user authentication request to a second information processing apparatus after execution of user authentication processing to thereby execute a job operation via the second information processing apparatus in accordance with a user authentication processing result obtained by the second information processing apparatus;

converting, by a first conversion unit, user authentication information to a conversion value;

storing, in a storage unit, first authentication reference information including at least a first conversion value that is a conversion value of user authentication information by the first conversion unit in a storage unit;

inputting user authentication information; and performing, by an authentication unit, user authentication processing based on the input user authentication information and a conversion value of user authentication information included in the first authentication reference information stored in the storage unit, and when the conversion result of the input user authentication information by the first conversion unit coincides with the first conversion value, determining that user authentication has been successful and adding a second conversion value that is a conversion value of the user authentication information by a second conversion unit to the first authentication reference information;

wherein, in performing the user authentication processing, the authentication unit queries the second information processing apparatus whether the second information processing apparatus performs user authentication processing using either the first conversion value or the second conversion value, wherein, when the authentication unit obtains a query result from the second information processing apparatus which indicates that the second information processing apparatus performs user authentication processing using the first conversion value, the authentication unit performs user authentication processing using the first conversion value, encrypts the second conversion value using an encryption key corresponding to the second information processing apparatus, and sends the encrypted second conversion value to the second information processing apparatus to make the second information processing apparatus store the second conversion value to control so that subsequent user authentication processing is performed using the stored second conversion value, and wherein, when the authentication unit obtains a query result from the second information processing apparatus which indicates that the second information processing apparatus performs user authentication processing using the second conversion value, the authentication unit controls so that the user authentication processing is performed using the second conversion value without using the first conversion value.

6. A non-transitory computer readable storage medium on which is stored computer executable code of a computer program for making a computer execute a user authentication method performed by a first information processing apparatus, the program comprising:

code for making a user authentication request to a second information processing apparatus after execution of user authentication processing to thereby execute a job operation via the second information processing apparatus in accordance with a user authentication processing result obtained by the second information processing apparatus;

code for converting, by a first conversion unit, user authentication information to a conversion value;

code for storing, in a storage unit, first authentication reference information including at least a first conversion value that is a conversion value of user authentication information by the first conversion unit;

code for inputting user authentication information; and code for performing, by an authentication unit, user authentication processing based on the input user authentication information and a conversion value of user authentication information included in the first authentication reference information stored in the storage unit, and when the conversion result of the input user authentication information by the first conversion unit coincides with the first conversion value, determining that user authentication has been successful and adding a second conversion value that is a conversion value of the user authentication information by a second conversion unit to the first authentication reference information;

wherein, in performing the user authentication processing, the authentication unit queries the second information processing apparatus whether the second information processing apparatus performs user authentication processing using either the first conversion value or the second conversion value, wherein, when the authentication unit obtains a query result from the second information processing apparatus which indicates that the second information processing apparatus performs user authentication processing using the first conversion value, the authentication unit performs user authentication processing using the first conversion value, encrypts the second conversion value using an encryption key corresponding to the second information processing apparatus, and sends the encrypted second conversion value to the second information processing apparatus to make the second information processing apparatus store the second conversion value to control so that subsequent user authentication processing is performed using the stored second conversion value, and wherein, when the authentication unit obtains a query result from the second information processing apparatus which indicates that the second information processing apparatus performs user authentication processing using the second conversion value, the authentication unit controls so that the user authentication processing is performed using the second conversion value without using the first conversion value.

\* \* \* \* \*